US009491141B2

(12) United States Patent
Carbou et al.

(10) Patent No.: US 9,491,141 B2
(45) Date of Patent: Nov. 8, 2016

(54) INCOMING REDIRECTION MECHANISM ON A REVERSE PROXY (75) Inventors: Romain Carbou, Brunoy (FR); Remi Bars, Louannec (FR)

(73) Assignee: ORANGE, Paris (FR)

(*) Notice: Subject to any disclaimer, the term of this patent is extended or adjusted under 35 U.S.C. 154(b) by 1 day.

(21) Appl. No.: 14/008,813

(22) PCT Filed: Mar. 30, 2012

(86) PCT No.: PCT/FR2012/050697
§ 371 (c)(1),
(2), (4) Date: Dec. 16, 2013

(87) PCT Pub. No.: WO2012/131275
PCT Pub. Date: Oct. 4, 2012

(65) Prior Publication Data
US 2014/0123266 A1 May 1, 2014

(30) Foreign Application Priority Data

Mar. 31, 2011 (FR) ...................................... 11 52748

(51) Int. Cl.
*H04L 29/06* (2006.01)
*H04L 29/08* (2006.01)
*H04L 29/12* (2006.01)

(52) U.S. Cl.
CPC ....... *H04L 63/0227* (2013.01); *H04L 61/2567* (2013.01); *H04L 61/301* (2013.01);
(Continued)

(58) Field of Classification Search
USPC ................................ 726/13, 11, 12; 713/153
See application file for complete search history.

(56) References Cited

U.S. PATENT DOCUMENTS

2002/0161904 A1* 10/2002 Tredoux .............. H04L 63/0281
709/229
2005/0223217 A1* 10/2005 Howard .................. G06F 21/31
713/155
(Continued)

FOREIGN PATENT DOCUMENTS

EP 1255395 A2 11/2002

OTHER PUBLICATIONS

International Search Report and Written Opinion dated Jul. 18, 2012 for corresponding International Application No. PCT/FR2012/050697, filed Mar. 30, 2012.
(Continued)

*Primary Examiner* — Jeffrey Pwu
*Assistant Examiner* — Samuel Ambaye
(74) *Attorney, Agent, or Firm* — David D. Brush; Westman Champlin & Koehler, P.A.

(57) ABSTRACT

A system is provided for filtering packets. The system includes: a filter for determining, by applying a set of at least one filtering rule, whether a packet is permitted to be routed towards a receiving entity. The system includes a verification element for verifying validity of an authentication token included in a request received by the filtering system and adds, to the set, after receiving an initial request, a so-called top-level filtering rule, permitting the routing, towards the verification element, of at least one packet received via a predetermined communication port of the device, in which the source address is identical to the source address of the initial request, regardless of the source communication port of the subsequent request. A routing element routes a subsequent request including a valid authentication token towards a receiving entity of the subsequent request.

12 Claims, 1 Drawing Sheet

(52) U.S. Cl.
CPC ........... *H04L61/303* (2013.01); *H04L 63/029* (2013.01); *H04L 63/0807* (2013.01); *H04L 67/2814* (2013.01); *H04L 67/2895* (2013.01); *H04L 61/2514* (2013.01)

(56) References Cited

U.S. PATENT DOCUMENTS

| | | |
|---|---|---|
| 2007/0174454 A1 | 7/2007 | Mitchell et al. |
| 2007/0271453 A1* | 11/2007 | Pohja ................... H04L 63/029 713/153 |
| 2010/0235632 A1* | 9/2010 | Iyengar et al. ............... 713/166 |

OTHER PUBLICATIONS

Tschofenig H. et al., "A Firewall/NAT Traversal Client for CASP; draft-tschofenig-nsis-casp-midcom-01.txt", 5. JCT-VC Meeting; 96. MPEG Meeting; Mar. 16, 2001-Mar. 23, 2011; Geneva; (Joint Collaborative Team on Video Coding of ISA/IEC JTC1/SC29/WG11AND ITU-T SG.16); URL: http://WFTP3.ITU.INT/AV-ARCH/JCTVC-SITE/-17/03/2011, INternet Engineering Task Forc, IETF, No. 1, Mar. 3, 2003, XP015005531.

Jones M. et al., "The OAuth 2.0 Protocol; Bearer Tokens; draft-ietf-oauth-v2-bearer Tokens"; Draft-IETF-OAUTH-V2-BEARER-01.TXT INternet Engineering Task Force, IETF; Standardworkingdraft, Internet Society (ISOC) 4, Rue Des Falaises CH—1205 Geneva, Switzerland, No. 1, Dec. 2, 2010, pp. 1-11, XP015072814.

International Preliminary Report on Patentability and Written Opinion in English dated Sep. 28, 2012 for corresponding International Application No. PCT/FR2012/050697, filed Mar. 30, 2012, 14 pages.

International Search Report in English dated Sep. 28, 2012 for corresponding International Application No. PCT/FR2012/050697, filed Mar. 30, 2012, 3 pages.

* cited by examiner

INCOMING REDIRECTION MECHANISM ON A REVERSE PROXY

CROSS-REFERENCE TO RELATED APPLICATIONS

This application is a Section 371 National Stage Application of International Application No. PCT/FR2012/050697, filed Mar. 30, 2012, which is incorporated by reference in its entirety and published as WO 2012/131275 on Oct. 4, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention relates to the field of telecommunications, and more precisely to a process and a device for filtering packets.

The invention lies in the context of a first device (for example a client terminal) in a first network (for example a corporate network) issuing a request (request to access content, control, sending of data or any other type of request) to a second device (for example a content server) in a second network (for example a home network), the two networks being interconnected via the internet network.

BACKGROUND OF THE DISCLOSURE

In such a context, the internet router of the home network, which allows users of the home network to access the internet, acts as a filtering and routing device for this remote access request, authorizing incoming connections on a case-by-case basis, with the aim of forwarding them to the device in the home network targeted in this request.

It is assumed that requests issued by a device in the first network are transmitted by way of a trusted relay entity, in the form of a relay server, for example. This relay server constitutes a "trusted" entity from the point of view of the gateway of the second network, as opposed to any other entity that might, from the internet, seek to directly access this gateway by means of its public address, without having been explicitly authorized to do so.

A dialog is thus established between this relay server and a Reverse Proxy agent of the gateway of the second network, a dialog during which the Reverse Proxy agent verifies the authorizations describing the access rights of a remote user as regards the data/content concerned by the request issued by the first device. This step is inexpensive in terms of resources and in terms of the quantity of information transmitted, since, in the example case of a request to access an item of multimedia content, it is simply a sequence of file search operations in a file system.

The transmission of a multimedia content is, however, potentially very expensive, as much in terms of network resources as in terms of processing capacity. A need has therefore emerged to avoid needlessly taxing the memory and CPU resources of the gateway of the second network, which must, as far as possible, be restricted to its routing function, and to avoid creating a choke point at the level of the relay server SVR or equipping this server with load management means.

Usually, a specific communication port, separate from the default communication port used to contact the Reverse Proxy agent, is thus dynamically allocated at the level of the public network interface of the gateway of the second network, a communication port the use of which is reserved for the first device. The redirection mechanism then consists in supplying to the client a redirection address composed of the public address of the gateway and of the communication port that has been specifically allocated.

Then, by a simple conventional incoming routing mechanism no longer involving the Reverse Proxy agent of the gateway of the second network, the request coming directly from the client is routed by this home gateway to the target device in the second network.

However, such a mechanism can be hindered by the presence in the first and/or second network of one or more firewalls able to filter the traffic to these non-standard communication ports. For example, the internet operator of the second network might very well adopt a restrictive policy challenging the ability to contact a specific communication port of the gateway from the internet. As another example, the first network may be equipped with firewalls filtering the outgoing traffic from this first network.

Finally, such a mechanism does not allow a distinction to be made between a plurality of client terminals, to which one and the same address is assigned when the firewall/proxy of the first network uses one and the same public address for communications established with the client terminals connected to this public network.

A need has thus emerged for a secure and generic solution for authorizing the crossing of a gateway in such a context.

SUMMARY

The invention relates, according to a first aspect, to a process for filtering packets implemented by a filtering device comprising filtering means for determining, by application of a set of at least one filtering rule, if a packet is authorized to be routed to a destination entity, the process comprising:

a step of verification of the validity of an authentication token for a source entity, which authentication token has been inserted into a request received by said filtering device, and, when said authentication token is valid:

a step of adding to said set of a filtering rule, termed second-level filtering rule, authorizing the routing of at least one packet to a destination entity if the source entity for this packet is identical to the source entity for said request;

a step of sending of the request to said filtering means.

The filtering process provides a method of controlling access to a network relying on the creation of a filtering rule appropriate for authorizing the routing to a destination entity for a request comprising a valid authentication token.

It is thus possible to make a distinction between a plurality of source terminals which might be issuing requests and to ensure that only a request coming from an authorized source entity can be routed to a destination entity by creation of an ad hoc filtering rule, authorizing the routing of the request with a valid authentication token.

According to one embodiment, the filtering process comprises a step of removal of the second-level filtering rule from said set after routing of the last packet relating to said request. The second-level filtering rule is therefore temporary: created for a single sending of data and coming to an end after sending and routing of the last packet relating to the request. This makes it possible to reinforce the security of access to the network. In fact, a subsequent request will be routed to its destination only if it also comprises a valid authentication token and if another filtering rule (also temporary) is created for this subsequent request.

According to an embodiment of the filtering process, the verification step comprises at least one of the following steps:
- determining if a validity period for the authentication token has expired: it is thus possible to check that a token is used shortly after its generation;
- determining if the authentication token has already been used in at least one other request received previously to said request: it is thus possible to impose the condition that a token is used once and once only;
- determining if the authentication token corresponds to the source address for said request: it is thus possible to impose the condition that the authentication token is used only by an authorized entity for which the source address is authenticated;
- determining if the authentication token corresponds to a content for which said request is issued: it is thus possible to impose the condition that the authentication token is used only for a planned and authorized use, i.e. access to a given content;
- determining if the authentication token has been generated with an encryption key specific to said device: it is thus possible to verify that the authentication token has not been falsified or generated by an unauthorized entity.

The aim of all of these steps is to limit the risk of fraudulent use and generation of an authentication token.

According to a first variant embodiment of the filtering process, the second-level filtering rule authorizes the routing to a destination entity for at least one packet for which the source address and the source communication port are respectively identical to the source address and to the source communication port for said request.

It is thus possible to restrict communication with the destination entity to the sole source entities identified by one and the same source address and one and the same source communication port. If moreover this source address is authenticated using the authentication token, it is possible to guarantee that the source entity is indeed an authorized source entity.

According to a second variant embodiment of the filtering process, the second-level filtering rule authorizes the routing to a destination entity for at least one packet for which the source communication port is identical to the source communication port for said request and for which the source address lies within a range of addresses including the source address for said request.

It is thus possible to take into account a modification of the source address of the source entity, which might for example occur following a redirection of an initial request coming from an initial source address.

According to a particular embodiment, the filtering process comprises:
- a step of generation of an authentication token following the receipt of an initial request not comprising an authentication token,
- a step of modification of the initial request by insertion of the generated authentication token into this initial request,
- a step of redirection of the modified initial request so that the modified initial request is reissued.

According to a particular case of this particular embodiment, the filtering process comprises:
- a step of generation of an authentication token after receipt, by way of a trusted entity, of an initial request not comprising an authentication token,
- a step of modification of an initial request by insertion of said authentication token into this initial request,
- a step of redirection of the modified initial request so that the modified initial request is reissued without going through said trusted entity.

The authentication token, which, in this instance, is representative of an access authorization granted to this request coming from a trusted entity, is inserted into the request which will undergo redirection, in order to guarantee, despite the fact that it no longer goes through the trusted entity, that it will be possible to recognize it as being a request authorized to be routed to a destination entity.

According to a variant of the particular embodiment, the filtering process comprises a step of adding to said set, after receipt of the initial request, a filtering rule, termed first-level filtering rule, authorizing the routing, to means (RP) for verifying of the validity of an authentication token contained in a request, of at least one packet received via a predetermined communication port,
the modified initial request being redirected in the step of redirection to the predetermined communication port.

In a particular case of this variant, the filtering process comprises a step of adding to said set, after receipt of the initial request, a filtering rule, termed first-level filtering rule, authorizing the routing, to means for verifying the validity of an authentication token contained in a request, of at least one packet, received via a predetermined communication port of said device, for which the source address is equal to the source address for the initial request, whatever the source communication port for the subsequent request,
the modified initial request being redirected in the step of redirection to the predetermined communication port.

The first-level filtering rule is thus intended to be used for the filtering of requests redirected with authentication token. It constitutes at first sight a sort of security flaw for the controlling of access to the network. However, given the combined use of this temporary first-level filtering rule with a mechanism of authentication by means of the authentication token, a redirected request able to benefit from this pseudo-flaw will comprise an authentication token which will have to be valid, in the absence of which this redirected request will not be able to be routed to its destination. Thus a measure with poor security (first-level filtering rule) is compensated for by very secure measures (authentication) and the set of these measures finally guarantees a high level of security.

Moreover, there is a limit to the number of communication ports having to be opened on said device, since a determined communication port will be used for redirected requests. This communication port can moreover be identical to that used for the issue of the initial request, and this while preserving security by virtue of the combined use of first- and second-level rules and of an authentication token.

According to a particular embodiment, the filtering process comprises a step of removal of the first-level filtering rule after receipt of a request comprising said authentication token or after expiry of a validity period for said first-level filtering rule.

The first-level filtering rule is temporary and can therefore subsist only for the time necessary for the redirection of the request for which it has been created. The risk of intrusions in the network is thus again limited.

According to a variant embodiment, the filtering process comprises, before the verification step, a step of filtering of said request received by the filtering means by application of said set comprising the first-level filtering rule.

The request thereby undergoes double filtering: first by the first-level filtering rule, then by the second-level filtering rule, with, between these two filtering steps, verification of the validity of the authentication token. The request will be finally routed to its destination only after having successfully passed these two filtering steps and the verification step. The whole is therefore particularly effective from the security point of view while remaining generic.

The various embodiments and variants mentioned above may be combined with each other for the implementation of the filtering process.

The invention relates, according to a second aspect, to a system for filtering packets comprising:

filtering means for determining, by application of a set of at least one filtering rule, if a packet is authorized to be routed to a destination entity;

means for verifying the validity of an authentication token comprised in a request received by said filtering system, means for adding to said set, after receipt of an initial request, a filtering rule, termed first-level filtering rule, authorizing the routing to said means for verifying at least one packet, received via a predetermined communication port of said device, for which the source address is equal to the source address for the initial request, whatever the source communication port for the subsequent request, means for routing a subsequent request comprising a valid authentication token to a destination entity for this subsequent request.

The advantages set out for the filtering process according to the invention may be transposed directly to the filtering system according to the invention as well as to the various embodiments of this system that are defined below.

According to an embodiment of the filtering system, the routing means comprise:

means for adding to said set, when said authentication token is valid, a filtering rule, termed second-level filtering rule, authorizing the routing of a packet to a destination entity if the source entity for this packet is identical to the source entity for said request;

means for sending the subsequent request to the filtering means.

According to one embodiment, the filtering system further comprises means for generating an authentication token after receipt of an initial request by way of a trusted entity, a step of modification of an initial request by insertion of said authentication token into this initial request, a step of redirection of the modified initial request so that the modified initial request is reissued without going through said trusted entity.

More generally, the filtering system according to the invention comprises means for implementing the steps of the process according to the invention and inversely the steps of the process are implemented.

The various embodiments and variants mentioned above may be combined with each other for the implementation of the filtering system.

According to a preferred implementation, the various steps of the process according to the invention are implemented by software or a computer program, this software comprising software instructions intended to be executed by a data processor of a filtering system and being designed for controlling the execution of the various steps of this process.

As a consequence, the invention also concerns a program, able to be executed by a computer or by a data processor, this program containing instructions for controlling the execution of the steps of a process such as that mentioned above.

This program can use any programming language, and be in the form of source code, object code or intermediate code between source code and object code, such as in a partially compiled form, or in any other desired form.

The invention also concerns a data storage medium that can be read by a data processor, and containing instructions from a program as mentioned above. The data storage medium can be any entity or device capable of storing the program.

According to one embodiment, the invention is implemented by means of software and/or hardware components. With this in mind, the term "module" can in this document correspond just as well to a software component as to a hardware component or to a set of hardware and software components.

A software component equates to one or more computer programs, one or more subprograms of a program, or in a more general manner to any element of a program or of software that is capable of implementing a function or a set of functions, according to what is described below for the module in question. Such a software component is executed by a data processor of a physical entity (terminal, server, gateway, set-top box, router, etc.) and is able to access the hardware resources of this physical entity (memories, recording media, communication buses, electronic input/output cards, user interfaces, etc.).

In the same way, a hardware component equates to any element of a hardware assembly that is capable of implementing a function or a set of functions, according to what is described below for the module in question. It can be a programmable hardware component or a component with an integrated processor for the execution of software, for example an integrated circuit, a chip card, a memory card, an electronic card for the execution of firmware, etc.

BRIEF DESCRIPTION OF THE DRAWINGS

Other aims, features and advantages of the invention will appear throughout the following description, given only by way of non-limiting example, and made with reference to the appended drawings, in which.

DETAILED DESCRIPTION OF ILLUSTRATIVE EMBODIMENTS

The invention is described in the example case of the processing of a request to access content, but it is applicable to any other type of request: request to poll a server, request to access a service, etc. The concept of request is intended to be interpreted here in the wider sense of the term: it involves sending of issued data to a destination entity by a source entity, a request being constituted by one or a plurality of data packets sent successively.

The invention is also described in the example case where this request is issued in accordance with the HTTP (Hypertext Transfer Protocol) and uses IP (Internet Protocol) addresses for identifying the source and destination entities of the requests/packets.

Using conventional terminology, the terms source (or destination) address and communication port for a packet/for a request will be used to denote the address and the communication port for a source entity (or for a destination entity) for this packet/this request.

Figure 1:
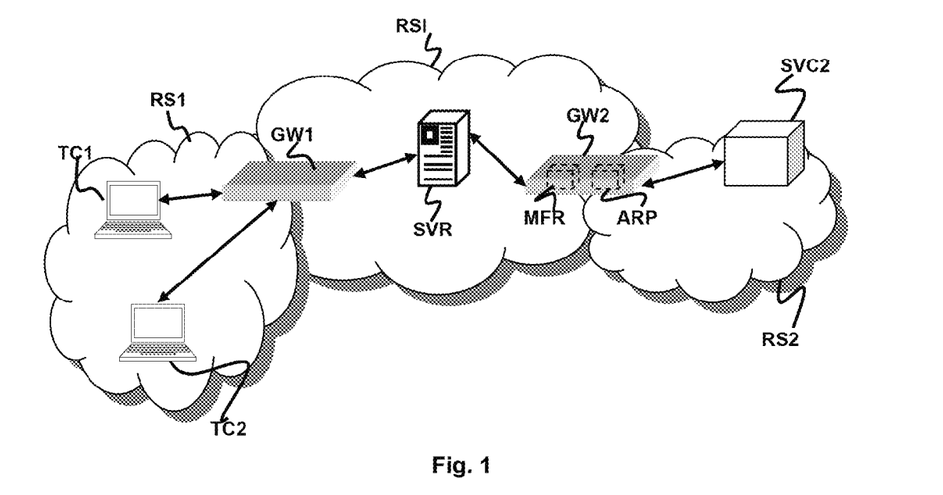
FIG. 1 is a diagram showing a communications system incorporating a device according to the invention.

The system shown in FIG. 1 is organized around three networks
- a first network RS1, for example a corporate network;
- a second network RS2, for example a home network;
- a network RI allowing the interconnection of the networks RS1 and RS2, for example the internet network.

Within the network RS1 are connected the following devices:
- a first client terminal TC1, in the form of a personal computer, for example;
- a second client terminal TC2, in the form of a personal computer, for example;
- a gateway GW1, acting for the devices connected to the network RS1 as a gateway for accessing the network RSI and via which the terminals TC1 and TC2 can establish communications with an entity outside the network RS1; this gateway in particular acts as a firewall and proxy for the network RS1, filtering the incoming and outgoing communications of the network RS1 and attributing public addresses and communication ports to the incoming and outgoing communications of this network RS1.

It is thus assumed here that the client terminal TC1 is connected to a network RS1 for which the outgoing traffic is filtered. As such, the client terminal TC1 can usually communicate with the entities of the remote home network RS2 only via "standard" destination communication ports (such as, for example and without loss of generality, the communication port 80 used as default port for the Hypertext Transfer Protocol.) The client terminal TC2 also has the aim of accessing the remote home network RS2, with its own authorizations, which can be separate from those granted to the client terminal TC1. The invention takes into account these various constraints through a generic mechanism for control of access to the network RS2.

Within the network RS2 are connected the following devices:
- a content server SVC2, on which is recorded a plurality of multimedia contents;
- a gateway GW2, acting for the devices connected to the network RS2 as a gateway for accessing the network RSI and via which the content server SVC2 can be contacted by an entity outside the network RS2; this gateway GW2 in particular acts as a firewall and proxy for the network RS2, filtering the incoming and outgoing communications of the network RS2 and attributing public addresses and communication ports to the incoming and outgoing communications of this network RS2.

The gateway GW2 is equipped with a firewall, incorporating a filtering and routing module MFR, subsequently called "filtering module" for short, having the responsibility of applying a set of filtering and routing rules defining the conditions in which a data packet coming into the network is or is not authorized to be routed to a destination entity. Such filtering and routing rules are also called access control rules. They are usually stored in memory in the form of an ordered list (ACL, "Access Control List"), with a predefined order for being taken into account. In the text which follows, the name "filtering rule" will be used.

On the assumption a data packet enjoys authorization to be routed to a destination entity, the filtering module MFR has the responsibility of sending the data packet under consideration to this destination entity: either a destination entity defined in this data packet, or a destination entity defined in a filtering and routing rule.

The gateway GW2 is equipped with a module ARP implementing the function of Reverse Proxy, subsequently called "proxy agent" for short, which has the particular responsibility of handling the requests for access to the internal resources of the network RS2 and of controlling access to these internal resources. The proxy agent ARP is configured to create, as needed, one or more of the filtering rules and to add them to the set of filtering rules managed by the filtering module MFR so that this filtering module applies the rules thus created.

In the text below, the following notation will be used:
- "@TC1_pub" for the public network address of the client terminal TC1, attributed by the gateway GW1 and used by the client terminal TC1 for communicating outside the network RS1;
- "nTC1_pub" for the public communication port of the client terminal TC1, attributed by the gateway GW1 and used by the client terminal TC1 for communicating outside the network RS1;
- "@TC2_pub" for the public network address of the client terminal TC2, attributed by the gateway GW1 and used by the client terminal TC2 for communicating outside the network RS1;
- "nTC2_pub" for the public communication port of the client terminal TC2, attributed by the gateway GW1 and used by the client terminal TC2 for communicating outside the network RS1;
- "@GW1_pub" the public network address of the gateway GW1;
- "@GW2_pub" the public network address of the gateway GW2;
- "nGW2_pub" a public communication port of the gateway GW2.

Figure 2:
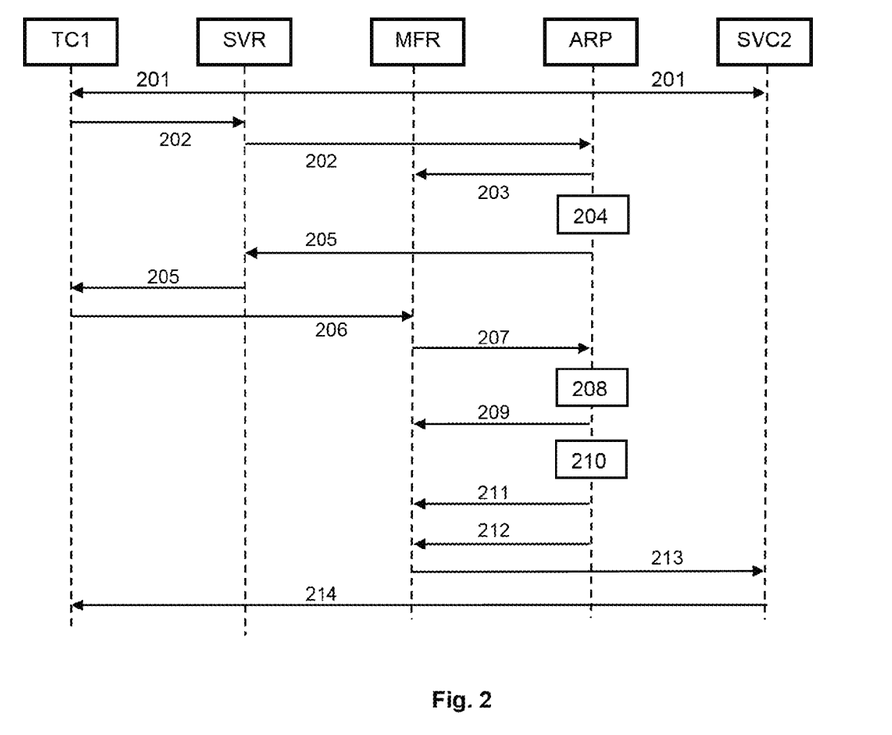
FIG. 2 shows a flow chart of an embodiment of the process according to the invention.

A first embodiment of the filtering process according to the invention is described in more detail with reference to FIG. 2.

It is considered that in this first embodiment the address @TC1_pub=@TC2_pub=@GW1_pub is the only public address that the gateway GW1 uses for the communications of the client terminals TC1, TC2, etc. In other words, @GW1_pub is the public address common to all these client terminals.

In a step 200, the client terminal TC1 authenticates itself to the relay server SVR. The relay server SVR proceeds with the authentication of the client terminal TC1 and verifies that this client terminal TC1 is effectively authorized to communicate with the gateway GW2 and the entities of the network RS2 that is accessible via this gateway GW2.

This relay server SVR constitutes a "trusted" entity from the point of view of the gateway GW2, unlike any other entity that might, from the internet, seek to access the gateway GW2 directly by means of its public address without having been explicitly authorized to do so. The relay server SVR and the gateway GW2, by way of example, implement a mutual authentication process at the end of which the gateway GW2 records the relay server SVR as being one of the trusted entities from which the packets are authorized to be routed to a destination entity in the network RS2. Or, more simply, the address of the relay server is known by the gateway GW2 (it can be part of its "factory" configuration") and is therefore trusted.

In a step 201, during which a user U1 of the client terminal TC1 asks to search the tree of shared-access multimedia content stored in the content server SC2. A dialog follows between the relay server SVR, the proxy agent ARP of the gateway GW2 and the content server SVC2, a dialog during which the proxy agent ARP verifies the authorizations describing the access rights of the remote user U1 for the resource SVC2 of the network RS2. This step 202 is inexpensive in terms of resources and in terms of the quantity of information transmitted, because it is simply a sequence of file search operations in a file system.

Finally, it is assumed that the user U1 selects a content C2, stored in the content server SC2, then asks to load this content C2 into the client terminal TC1, with the aim of recovering this content on the fly (for example, the case of a piece of music streamed by the content server SC2) or of a previous recording of this content.

The transmission of an item of multimedia content is potentially expensive, as much in terms of network resources as in terms of processing capacity. The following steps, described below, avoid needlessly taxing the memory and CPU resources of the gateway GW2 (which must, as far as possible, be restricted to its routing function) and creating a choke point at the level of the relay server SVR or equipping this server with means for managing its load.

In step 202, following the request of the user U1, an initial request, for access to the content C2, is issued by the client terminal TC1 and transmitted to the relay server SVR, which validates it then routes it to the proxy agent ARP of the gateway GW2. The latter, by a mechanism known to those skilled in the art, detects that this initial request is a request for access to a content stored on the content server SVC2.

Such a detection mechanism is typically based on the detection of primitives of standard protocols, such as the "Get" primitive of the http protocol.

This initial request comprising, for example, the URL (Uniform Resource Locator) of the content C2 and identifying the content server SVC2 as an entity from which this content is able to be obtained.

http://192.168.0.10/Album1/Vacances/photo99.jpg

In the step 202 of sending of the initial request, the address @TC1_pub is transmitted to the proxy agent ARP by the relay server SVR (for example in the http header or in the URL of this initial request.)

In step 203, on receipt of this initial request coming from the relay server SVR, the proxy agent ARP dynamically creates a first temporary filtering rule, with a short validity period, to be applied by the filtering module MFR of the gateway GW2, having the aim of temporarily routing to the proxy agent ARP any subsequent data packet, coming into the network RS2, to the public address @GW2_pub of the gateway GW2 and on a given communication port nGW2_pub (for example the communication port 80) coming from the address @TC1_pub, whatever the source communication port for this packet. This first filtering rule is added to the set of filtering rules that is managed and applied by the filtering module MFR.

The first filtering rule is also called a first-level rule, in that it will be applied before any other rule, termed second-level rule, as will be described further on.

The source communication port used by the gateway GW1 for the communications of the client terminal TC1 is likely to change (according to the entity or entities via which these communications are routed or in the event of redirection of a request): this change of port even has a recommended/standard nature and it prevents the a priori knowledge, at the level of the proxy agent ARP, of the source port that will be used by the gateway GW1 of the client terminal TC1 when the latter, for the first time, directly addresses the gateway GW2. As a consequence, in order to take into account any communication port able to be used subsequently by the gateway GW1 for the communications of the client terminal TC1, the first filtering rule does not impose any conditions on the source communication port for a packet to be filtered/routed.

It should be noted that the communication port used in this first rule is unique, assigned and therefore common to the different packets coming from a given source address. It makes it possible to set up an authentication method based on the source address for a packet, independently of the communication port used by a subsequent packet.

This first filtering rule is shown in the table below. The last column specifies one or more actions to execute when a packet verifies the conditions specified in the other columns.

| Source address | Source port | Destination address | Destination port | Protocol | Action(s) |
|---|---|---|---|---|---|
| @GW1_pub | * | @GW2_pub | 80 | HTTP | Route to RP agent Validity period limited to N seconds |

The asterisk ("*") in the "source port" column signifies that this rule does not impose any conditions on the source communication port for a packet to be filtered: whatever the communication port, if the other conditions are verified, then the packet to be filtered will be routed to the proxy agent ARP, according to what is specified by the "Action" column.

This first filtering rule is a temporary rule: it must be removed no later than on expiry of a validity period (N seconds) defined for this first rule. For security reasons, this validity period is very short, of the order of 2 to 3 seconds maximum, i.e. barely more than the necessary time for the redirection of the initial request and the receipt of the redirected request (subsequent steps 204 to 207.) It is thereby possible to limit fraudulent attempts to enter the network RS2 using the address @TC1_pub as source address, attempts which would not come from the client terminal TC1.

At this stage in fact, any client terminal other than the client terminal TC1 (for example TC2) is also authorized to issue traffic to the gateway GW2. It is therefore important, in the steps that follow, to be able to authenticate the client terminal TC1 on the basis of its source address in order to distinguish the requests coming from an authorized terminal (TC1) from those coming from another terminal (TC2).

In step 204, as soon as the first filtering rule is created and activated by the filtering module MFR, the proxy agent ARP prepares the reply to the initial request received at step 202 via the relay server SVR.

This initial request comprising a URL identifying and locating the content on the content server SVC2. This URL is of the form:

http://192.168.0.10/Album1/Vacances/photo99.jpg

This URL is therefore known to the proxy agent ARP and will be modified by this agent in the following manner.

The proxy agent ARP generates a temporary authentication token, in the form of an alphanumeric sequence for example, which is used to authenticate the issuer of the initial request. This authentication token is inserted into the initial request, the request thus modified then being redirected so that this modified request is reissued by the client terminal TC1 without going through the relay server SVR.

The authentication token is generated by a digital hash function, which is considered to be robust and is known to those skilled in the art (for example a hash algorithm of MD5, RIPE MD160, etc. type), from data chosen from among the following data:
- the source address for the initial request;
- the destination address for the initial request or the public address of the gateway GW2;
- an identification for the content.

This authentication token has the following properties:
- it must not be falsifiable (the client terminal TC1 must not be able to generate such a token "by chance");
- only the proxy agent ARP of the gateway GW2 is capable of generating such a token (in the hash algorithm, an encryption key is used that is specific to this proxy agent ARP and known only to this proxy agent)
- it is single-use;
- it is specific to the demanded content, for example generated from an identification for the content (URL or other identifier): a token is thus valid only for a given content;
- it is specific to a source address: a token is thus valid only for a given source address;
- it has a limited validity period, for example of the order of a few seconds.

Other security properties can be imposed on the semantics of the authentication token, without loss of generality for the present invention.

Example of an authentication token: hf3ffaba5be643ea0

This authentication token is inserted into or attached to the reply to the initial request generated by the proxy agent ARP. Upon generation of this reply, a mechanism which does not assume any specific implementation on the content server SCV2 or on the client terminal TC1 is preferably used for processing the reply thus generated.

An example of one such generic mechanism suitable for inserting the authentication token is to insert it as a "GET" parameter into the initial URL, the URL thus modified being used to form the reply to the initial request.

Example of a URL modified with an authentication token:
http://192.168.0.10/Album1/Vacances/photo99.jpg&token=f3ffaba5be643ea0

The initial request will moreover be redirected. To implement this redirection, additional modifications are performed by the Reverse Proxy agent on the reply generated: addition of a redirection code indicating that the initial request must be reissued and modification of this initial request so that it is directed upon its reissue to the public address @GW2_pub of the gateway GW2 and to the communication port nGW2_pub of the gateway GW2, the port having been chosen in the first filtering rule as destination communication port authorized for the subsequent requests.

When the initial request is issued in accordance with the http protocol and comprises a target URL, this URL is modified so that it contains the public address @GW2_pub of the gateway GW2 and the communication port nGW2_pub of the gateway GW2, and so that it designates the gateway GW2 as an entity from which the content C1 is able to be obtained.

For example, if the public address @GW2_pub is "193.210.3.5" and the communication port nGW2_pub is the port 80, the modified URL will be of the following form:
http://193.210.3.5:80/192.168.0.10/Album1/Vacances/photo99.jpg&token=f3ffaba5 be643ea0

Note: the possible mechanisms of substitution of character strings in a URL, having the aim of masking the private address of the content server SCV2 (here, "192.168.0.10") and/or the access path to the content (here, "/Album1/Vacances/photo99.jpg") are not described here but may be used as needed.

In step 205, the reply to the initial request, comprising the modified URL as described above, comprising particularly the authentication token and a redirection code, is sent to the relay server SVR, which then transmits it to the client terminal TC1.

In step 206, following receipt of the reply to the initial request, the client terminal TC1 generates a second http request from the modified URL included in the received reply. This second request is issued by the client terminal TC1 by way of the gateway GW1: it has as source address @TC1_pub and as source communication port the communication port nTC1_pub, which according to the normative document RFC 2616 distributed by the IETF must be specific to this second request and is thus a priori separate from the source communication port for the initial request.

The pair constituted by the source address @TC1_pub and the communication port nTC1_pub is representative not only of the client terminal TC1 but also of the client application of this terminal which issues this second request, in that this communication port has been assigned to this client application by the gateway GW1 for entering into communication with the content server SVC2.

The communication port nTC1_pub is at this stage a priori unknown to the gateway GW2 and could not be ascertained by this gateway GW2 by any mechanism whatsoever.

The second request, comprising the authentication token and the modified URL, is thus issued to the public address @GW2_pub of the gateway GW2 and to the communication port nGW2_pub of this gateway GW2, without going through the relay server SVR.

In step 207, when the second http request arrives at the gateway GW2, it has @TC1_pub as source address and, in accordance with the first filtering rule, it is routed by the filtering module MFR to the proxy agent ARP.

In step 208, the proxy agent ARP then looks for the presence of an authentication token in this second request, in this instance in the URL contained in this second request. If the proxy agent ARP finds an authentication token, it extracts it and verifies its validity.

This verification comprises at least one of the following steps:
- determining if a validity period for the authentication token has expired: in this case the authentication token is considered to be invalid;
- determining if the authentication token was already present/used in at least one other request received previously to this second request: in this case the authentication token is considered to be invalid (single-use token);
- determining if the authentication token has been generated with an encryption key specific to the proxy agent ARP: in this case the authentication token is considered to be valid and guarantees that it is a request having already been received by the proxy agent ARP;
- determining if the authentication token corresponds to the source address of the second request and/or to the content for which this second request is issued, i.e. if it forms an exact hash for this source address and/or for the URL of the content: in this case the authentication token is considered to be valid and guarantees by its presence that the source and/or the content of the second request are identical to the source and/or to the content of the initial request.

In step 209, if the token is absent or invalid, the second request is ignored by the proxy agent ARP and is not transmitted to a destination entity in the RS2 network. If by contrast the token is valid, the Reverse Proxy removes the first filtering rule from the set of filtering rules that is managed by the filtering module MFR, unless it has already been removed due to the expiry of its validity period. The following steps 210-214 are executed if the authentication token is valid.

In step 210, the proxy agent ARP obtains the source communication port for the second request, for example by extracting it from the header of this second request.

In step 211, the proxy agent ARP creates a second filtering rule, also temporary, then adds this rule to the set of filtering rules applied by the filtering module MFR.

This second filtering rule is also called a second-level rule, in that it is intended to be applied after another rule, termed first-level rule.

This second filtering rule authorizes the routing of a packet to a destination entity for this packet if the source entity for this packet is identical to the source entity for this second request, in this instance if the source address and the source communication port for this packet are identical to the source address @TC1_pub and to the source communication port nTC1_pub for this second request.

| Source address | Source port | Destination address | Destination port | Protocol | Action(s) |
|---|---|---|---|---|---|
| @GW1_pub | nTC1_pub | @GW2_pub | 80 | HTTP | Authorize routing to a destination entity in the network RS2 Remove the rule after routing of the last packet |

This second rule must also be removed (cf. "Actions" column) after routing of the last packet of a request verifying the conditions of source address, source communication port, destination address and destination communication port that are specified in this second rule.

In step 212, the proxy agent ARP resends the second request to the filtering module MFR so that the second filtering rule is applied to it and so that this second request is finally routed, in step 213, to the destination entity for this second request, in this instance to the content server SVC2.

The second request is thus itself subjected in step 212 to the second rule newly created on receipt of this second request. Such a mechanism of dynamic creation of a routing rule, to which is subjected a request which has characterized the filtering conditions defined by this second rule (notably due to the detection of the source communication port on the fly), assumes close low-level integration between the Reverse Proxy RP and the filtering and routing module MFR implementing the protocol stack in the gateway GW2.

By a simple mechanism of conventional incoming routing, the initial request coming directly from the client TC1 is thus routed by the gateway GW2 to the content server SVC2.

In step 214, the content server SCV2 receives the second request and replies to it by sending data packets constituting the content C1 to the client terminal TC1.

If a second client terminal TC2 from the same network RS1 as the client terminal TC1, for which the public address is also @TC1_pub, wishes to access a resource that is present on the network RS2 before the second filtering rule is removed, and if the proxy agent ARP receives an initial request, this time from the client terminal TC2, then the third temporary filtering rule, with a limited validity period, created by this agent on receipt of this other initial request, takes into account the communication port nTC1_pub currently used by the client terminal TC1 and differs from the first filtering rule only in that the condition on the source communication port is that the latter is different from the communication port nTC1_pub currently in use.

This third filtering rule is, like the first filtering rule, a first-level rule.

| Source address | Source port | Destination address | Destination port | Protocol | Action(s) |
|---|---|---|---|---|---|
| @GW1_pub | *, ≠nTC1_pub | @GW2_pub | 80 | HTTP | Route to RP agent Validity period limited to N seconds |

At this step, the set of filtering/routing rules that is managed by the filtering module MFR simultaneously comprises the second and third rules according to the table below:

| Source address | Source port | Destination address | Destination port | Protocol | Action(s) |
|---|---|---|---|---|---|
| @GW1_pub | *, ≠nTC1_pub | @GW2_pub | 80 | HTTP | Route to RP agent Validity period limited to N seconds |
| @GW1_pub | nTC1_pub | @GW2_pub | 80 | HTTP | Authorize routing to a destination entity in the network RS2 Remove the rule after routing of the last packet |

Alternatively, instead of managing an exclusion on the source communication port in the third filtering rule, the order of the rules and the scanning mode for the set of rules can be such that the second rule is always applied with priority over the third rule.

These two alternatives make it possible to guarantee that a packet, for which the source address is @TC1_pub and the source communication port is nTC1_pub, is indeed routed to its destination entity (i.e. to the content server SVC2) and not to the Reverse Proxy agent.

After redirection of the initial request coming from the client terminal TC2, then receipt of the redirected request resulting therefrom (steps 204 to 210 being repeated for the initial request coming from the client terminal TC2), the Reverse Proxy agent creates a fourth filtering rule, which authorizes the routing of a packet to a destination entity for this packet if the source entity for this packet is identical to the source entity for the redirected request, in this instance if the source address and the source communication port for this packet are identical to the source address @TC2_pub and to the source communication port nTC2_pub for this redirected request.

This fourth filtering rule is, like the first filtering rule, a second-level rule.

| Source address | Source port | Destination address | Destination port | Protocol | Action(s) |
|---|---|---|---|---|---|
| @GW1_pub | nTC2_pub | @GW2_pub | 80 | HTTP | Authorize routing to a destination entity in the network RS2 Remove the rule after routing of the last packet |

This fourth filtering rule must, like the second rule, be removed (cf. "Actions" column) after routing of the last packet of a request verifying the conditions of source address, source communication port, destination address and destination communication port that are specified in this second rule.

The principles set out above, when in the presence of more than one terminal simultaneously accessing the network RS2, are generalized to any number of terminals, by managing the exclusions of the source communication ports used by these terminals in the definition of the temporary filtering rule which routes the requests to the Reverse Proxy agent.

In a second embodiment of the filtering process according to the invention, in the scenario where @TC1_pub differs from @TC2_pub, the following rules are created in succession for the requests coming from the client terminal TC1:
on receipt of the initial request, a first first-level filtering rule defined as follows:

| Source address | Source port | Destination address | Destination port | Protocol | Action(s) |
|---|---|---|---|---|---|
| @TC1_pub | * | @GW2_pub | 80 | HTTP | Routing to RP agent Validity period limited to N seconds | on receipt of a redirected request with valid authentication token, a second second-level filtering rule defined as follows:

| Source address | Source port | Destination address | Destination port | Protocol | Action(s) |
|---|---|---|---|---|---|
| @TC1_pub | nTC1_pub | @GW2_pub | 80 | HTTP | Authorize routing to a destination entity in the network RS2 Remove the rule after routing of the last packet |

In the same way, for the requests coming from the client terminal TC2, the following rules will be created in succession:
on receipt of the initial request, a first first-level filtering rule defined as follows:

| Source address | Source port | Destination address | Destination port | Protocol | Action(s) |
|---|---|---|---|---|---|
| @TC2_pub | * | @GW2_pub | 80 | HTTP | Routing to RP agent Validity period limited to N seconds | on receipt of a redirected request with valid authentication token, a second second-level filtering rule defined as follows:

| Source address | Source port | Destination address | Destination port | Protocol | Action(s) |
|---|---|---|---|---|---|
| @TC2_pub | nTC2_pub | @GW2_pub | 80 | HTTP | Authorize routing to a destination entity in the network RS2 Remove the rule after routing of the last packet |

It should be noted that, in this second embodiment, no communication port exclusion is necessary on receipt of an initial request since each comes from a different source address, according to the scenario.

In a third embodiment of the filtering process according to the invention, in the most unfavourable scenario, where, for one and the same client terminal TC1, the gateway would use two different addresses @TC1_pub and @TC1'_pub for the initial request and the redirected request, it is possible, instead of using the @TC1_pub address, a continuous range [@11, @12] of addresses including the public source address @TC1_pub used in the initial request. In this third embodiment, the address @GW1_pub, used in the definition in the filtering rules of the first embodiment, is therefore replaced by this range of addresses [@11, @12].

APPLICATION OF THE INVENTION

The invention is applicable for remote access to a local area network, for example a home network or a corporate network. It makes it possible to take into account the operating constraints of the source network RS1 when the security policy imposes rules for going through a proxy.

It makes it possible to manage access to one and the same network by one or more client terminals TC1, TC2 by use, on the gateway GW2 for access to the destination network, of a unique standard communication port, common to these different terminals.

It relies on a generic mechanism of redirection of an initial request, relayed by a trusted entity, with insertion of an authentication token into the redirected request, in order to be able to authenticate the sender of the redirected request while at the same time guaranteeing that the redirected request will no longer be relayed by this relay entity.

By analysis of the authentication token received in a redirected request, it becomes possible to determine if the request has been authorized and to subject this redirected request on the fly to a filtering and routing rule created dynamically and involving a criterion on the source communication port defined on the basis of the source communication port for the redirected request.

The scope of application covers situations as diverse as visual display, download, the transfer by a remote user of multimedia content present on a multimedia server of this home network, or else remote control, by a trusted third party, of household appliances (energy management, lighting, watering, window and door controls, etc.) equipped with a network interface allowing them to be controlled by a control device.

The invention claimed is:

1. A process for filtering packets implemented by a filtering device comprising a filter configured to determine, by application of a set of at least one filtering rule, if a packet is authorized to be routed to a destination entity, the process comprising:
  a step of generating an authentication token after receipt, by way of a trusted entity, of an initial request from a source entity, which does not include an authentication token;
  a step of modifying the initial request by insertion of said authentication token into this initial request to form a modified initial request;
  a step of forming a response to the initial request, to indicate redirection of the modified initial request so that the modified initial request is re-issued without going through the trusted entity;
  a step of verification of validity of the authentication token in a second redirected request generated from the modified initial request received by the filtering device, and,
when said authentication token is valid:
  a step of adding to said set a second-level filtering rule, authorizing routing of at least one packet to the destination entity if a source entity for this packet is identical to the source entity for said second request;
  a step of sending of the second request to said filter.

2. The process as claimed in claim 1, wherein the step of generating a response comprises:
  a step of generation of an authentication token following the receipt of the initial request, wherein the initial request does not comprise an authentication token,
  a step of modification of the initial request by insertion of the generated authentication token into this initial request to form a modified initial request,
  a step of forming the response to indicate redirection of the modified initial request.

3. The process as claimed in claim 2, further comprising a step of adding to said set, after receipt of the initial request, a filtering rule, termed first-level filtering rule, authorizing the routing, to means for verifying the validity of an authentication token contained in a request, of at least one packet received via a predetermined communication port, the modified initial request being redirected in the step of redirection to the predetermined communication port.

4. The process as claimed in claim 1, comprising a step of removal of the second-level filtering rule from said set after routing of the last packet relating to said request.

5. The process as claimed in claim 1, in which the verification step comprises at least one of the following steps:
  determining if a validity period for the authentication token has expired;
  determining if the authentication token has already been used in at least one other request received previously to said request;
  determining if the authentication token corresponds to the source address of said request;
  determining if the authentication token corresponds to a content for which said request is issued;
  determining if the authentication token has been generated with an encryption key specific to said device.

6. The process as claimed in claim 1, in which the second-level filtering rule authorizes routing to a destination entity for at least one packet for which the source address and the source communication port are respectively identical to the source address and to the source communication port for said request.

7. The process as claimed in claim 1, in which the second-level filtering rule authorizes routing to a destination entity for at least one packet for which the source communication port is identical to the source communication port for said request and for which the source address is included in a range of addresses including the source address for said request.

8. The process as claimed in claim 2, further comprising a step of adding to said set, after receipt of the initial request, a filtering rule, termed first-level filtering rule, authorizing routing, to means for verifying the validity of an authentication token contained in a request, of at least one packet, received via a predetermined communication port of said device, for which the source address is equal to the source address for the initial request, whatever the source communication port for the subsequent request, the response indicating redirection of the modified initial request to the predetermined communication port.

9. The process as claimed in claim 3, comprising a step of removal of the first-level filtering rule after receipt of a request comprising said authentication token or after expiry of a validity period for said first-level filtering rule.

10. The process as claimed in claim 9, previously to the verification step, a step of filtering of said request received by the filter by application of said set comprising the first-level filtering rule.

11. A system for filtering packets comprising:
  a non-transitory computer-readable memory comprising instructions stored thereon; and a module comprising a processor, which is configured by the instructions to perform acts of:
  generating an authentication token after receipt, by way of a trusted entity, of an initial request from a source entity, which does not include an authentication token;
  modifying the initial request by insertion of said authentication token into this initial request to form a modified initial request;
  forming a response to the initial request, to indicate redirection of the modified initial request so that the modified initial request is re-issued without going through the trusted entity;
  verifying the validity of an the authentication token included in, a second redirected request generated from the modified initial request received by the system; and
  adding a second-level filtering rule to a set of at least one filtering rule, when said verifying the validity of the authentication token has verified that the authentication token in the second redirected request is valid, the second-level filtering rule authorizing the routing of a future packet to a destination entity if a source address and source communication port of the future packet is identical to a source address and source communication port of the second redirected request with the valid authentication token.

12. A gateway comprising a filtering system as claimed in claim 11.

* * * * *

UNITED STATES PATENT AND TRADEMARK OFFICE
CERTIFICATE OF CORRECTION

PATENT NO. : 9,491,141 B2
APPLICATION NO. : 14/008813
DATED : November 8, 2016
INVENTOR(S) : Romain Carbou and Rémi Bars Page 1 of 1

It is certified that error appears in the above-identified patent and that said Letters Patent is hereby corrected as shown below:

Please correct one of the names of the inventor/applicant, so that "Remi Bars" is written as "Rémi Bars".

In Claim 11, please amend Line 59 of Column 18 by removing the word "an".

Signed and Sealed this
Nineteenth Day of February, 2019

Andrei Iancu
*Director of the United States Patent and Trademark Office*